United States Patent [19]

Suzuki

[11] Patent Number: 5,414,414
[45] Date of Patent: May 9, 1995

[54] DATA COMMUNICATION SYSTEM WITH CHANNEL SWITCHES

[75] Inventor: Eiji Suzuki, Tochigi, Japan

[73] Assignee: Fujitsu Limited, Kawasaki, Japan

[21] Appl. No.: 2,103

[22] Filed: Jan. 8, 1993

Related U.S. Application Data

[63] Continuation of Ser. No. 779,170, Oct. 21, 1991, abandoned, which is a continuation of Ser. No. 305,964, Feb. 3, 1989, abandoned.

[30] Foreign Application Priority Data

Feb. 3, 1988 [JP] Japan ............... 63-023226

[51] Int. Cl.⁶ ................................. H04J 3/14
[52] U.S. Cl. ...................... 340/825.01; 340/825.03; 370/16; 455/8
[58] Field of Search ............ 340/825.01, 825.03, 340/827; 370/16; 371/8.1, 8.2, 68.1, 68.2; 455/8, 15, 59, 103; 375/38

[56] References Cited

U.S. PATENT DOCUMENTS

| | | | |
|---|---|---|---|
| 3,409,875 | 11/1968 | Jager et al. | 371/8.2 |
| 3,526,837 | 9/1970 | Zegers et al. | 371/8.2 |
| 4,047,151 | 9/1977 | Rydbeck et al. | 375/26 |
| 4,234,956 | 11/1980 | Adderley et al. | 375/38 |
| 4,490,830 | 12/1984 | Kai et al. | 455/59 |
| 4,646,286 | 2/1987 | Reid et al. | 340/825.01 |
| 4,797,903 | 1/1989 | Itoh | 455/59 |
| 4,799,237 | 1/1989 | Itoh | 375/38 |
| 4,811,359 | 3/1989 | Nakajima et al. | 375/40 |

FOREIGN PATENT DOCUMENTS

| | | |
|---|---|---|
| 2-359553 | 2/1978 | France . |
| 32-06749 | 9/1983 | Germany . |
| 54-96313 | 7/1979 | Japan . |
| 56-98033 | 7/1981 | Japan . |

OTHER PUBLICATIONS

Siemens (Telcom Report), No. 9, Mar. 1986, pp. 181–186; H. Barth et al.: "Ersatzschalteinrichtungen fur Digitalrichtfunkverbindungen".

Primary Examiner—Michael Horabik
Attorney, Agent, or Firm—Staas & Halsey

[57] ABSTRACT

A data communication system which operates by the use of a main channel, and also a protection channel to back up the main channel using a channel switching circuit connected between a receiver and a transmitter. A receiver side channel switch includes a delay function for delaying the main channel data. A transmitter side channel switch includes a delay function for delaying the protection channel data when switching channels when a transmission fault occurs. The thus delayed data is effective for preventing a stoppage of data flow even in the event of a sudden transmission fault.

18 Claims, 13 Drawing Sheets

DATA COMMUNICATION SYSTEM WITH CHANNEL SWITCHES

This application is a continuation of application Ser. No. 07/779,170, filed Oct. 21, 1991, now abandoned which is a continuation of Ser. No. 07/305,964 filed Feb. 3, 1989, now abandoned.

BACKGROUND OF THE INVENTION

1. Field of the Invention

The present invention relates to a data communication system having a channel switching means, for example, a radio data communication system provided with channel switching equipment between a main channel and a protection channel.

2. Description of the Related Art

Usually, a channel switching means which is employed in a data communication system uses both a main channel and protection channel. That is, when the transmission quality of the main channel deteriorates, and accordingly a data error rate increases, a transmitting terminal station automatically switches the transmission line from the main channel, which is transmitting data to a receiving terminal station, to the protection channel, which is transmitting auxiliary data thereto. To cope with this, the receiving terminal station selects data received via the protection channel instead of the main channel, and outputs the same as main channel data.

The above-mentioned channel switching can be performed without even an instantaneous interruption in the flow of data if the above-mentioned transmission quality deteriorates slowly. However, if the transmission quality deteriorates quickly, it is very liable to result in an instantaneous interruption in the flow of data. Thus, in the field of data communication systems, it has been hoped to prevent such an instantaneous interruption in data flow caused by channel switching when rapid deterioration of the transmission quality occurs due to, for example, sudden fading.

In the prior art, as will be exemplified in detail hereinafter, there is an inevitable loss of data during the short transition period when switching from the main channel to the protection channel. Thus, the prior art channel switching means used in data communication systems produces a problem in that there is a high probability of a data error occurring when there is a rapid deterioration in transmission quality.

SUMMARY OF THE INVENTION

Accordingly, an object of the present invention is to provide a data communication system having a channel switching means which can prevent an instantaneous interruption in data flow during channel switching even when there is a rapid deterioration in the transmission quality.

To attain the above object, the channel switching means is constructed using a delay means. The delay means is employed at least in a receiver positioned along a data transfer path of the main channel data. Preferably, another delay means is employed in a transmitter along a data transfer path connected between a data source and the transmission line for the protection channel. The delay means is effective for recovering preceding data which was present just before the start of the related channel switching operation.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the related art and the disadvantages therein will be described with reference to the related figures.

Figure 1:
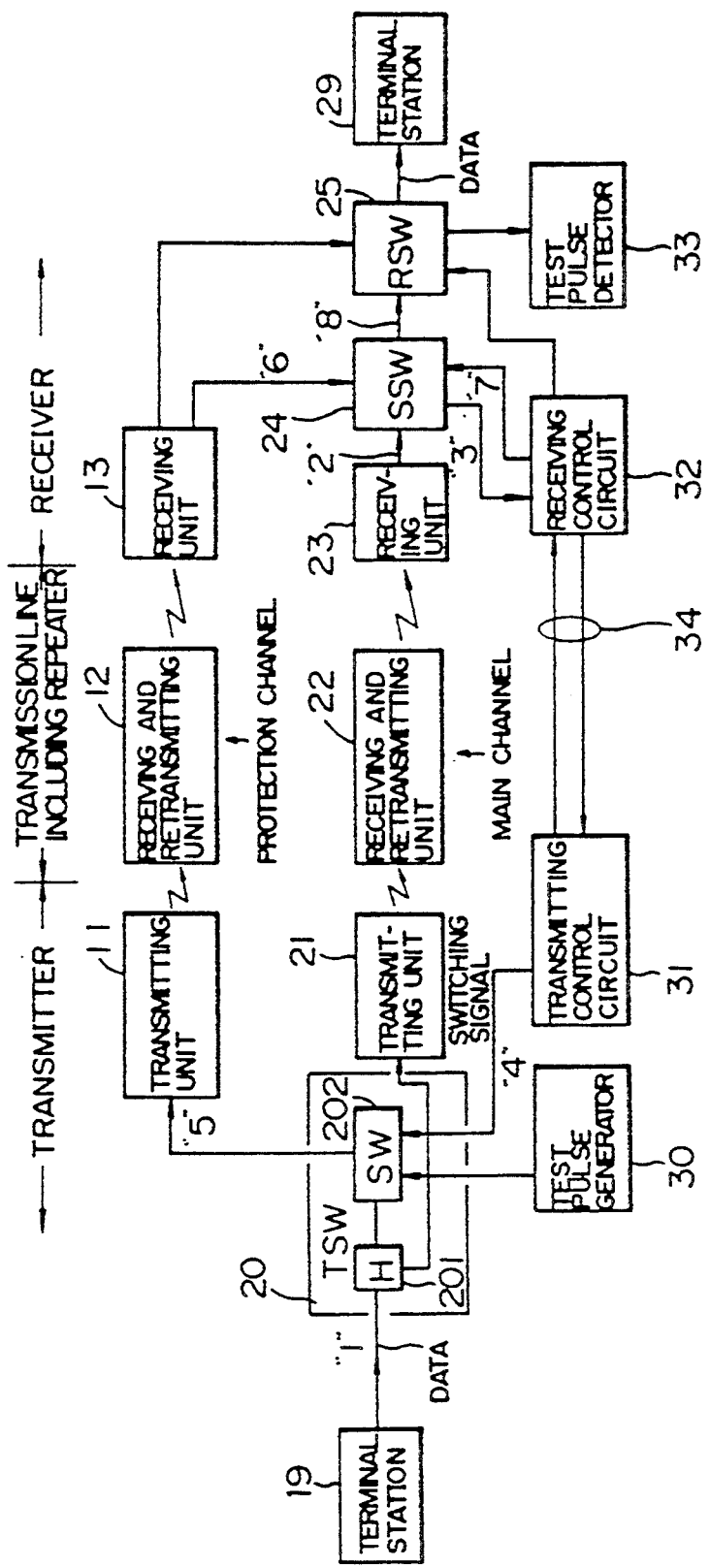
FIG. 1 is a general block diagram of a prior art data communication system.
Figure 2:
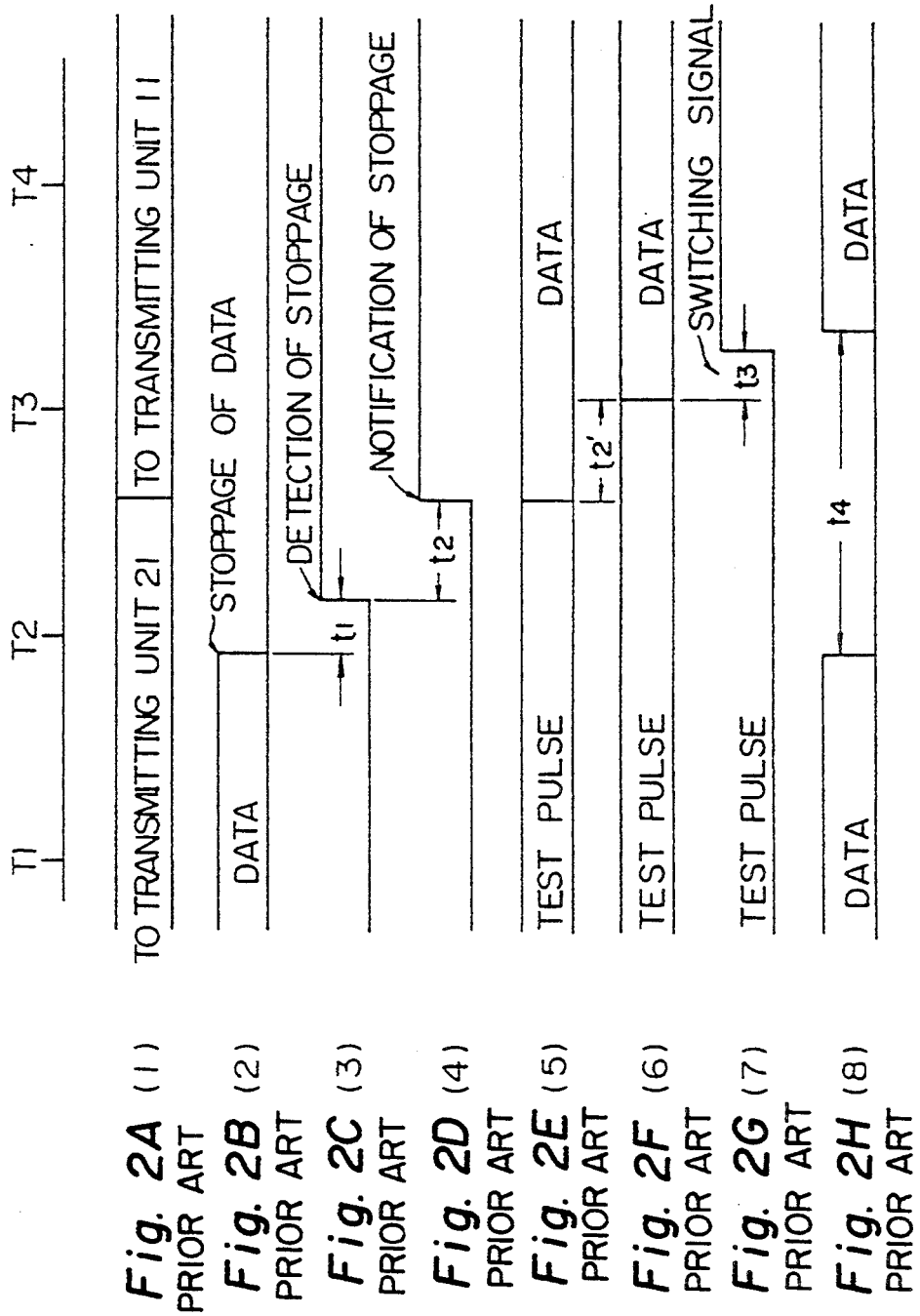
FIGS. 2A through 2H show timing charts showing one example of a channel switching procedure when a fault occurs in the system of FIG. 1.

FIG. 1 is a general block diagram of a prior art data communication system, and FIGS. 2A through 2H are timing charts for showing one example of a channel switching procedure when a fault occurs in the system of FIG. 1. The operation of the channel switching performed in the data communication system of FIG. 1 will be clarified with reference to the timing charts shown in FIGS. 2A through 2H. The numerals in parentheses in the leftmost column in FIGS. 2A through 2H indicate the signals at portions referenced by the numerals enclosed in quotation marks "" in FIG. 1. The following explanation will use as an example a system having a single protection channel and a single main channel. In actuality, a plurality of channels exist, in the form of, for example, frequency division multiplex communication (FDM), used in the main channel. However, for the sake of simplicity only one channel is shown (this also applied to later figures).

(A) Case Where Main Channel and Protection Channel are Normal

Bipolar data is provided by a data source located in, for example, a transmitting terminal station 19. The data is branched in two directions by a hybrid circuit (H) 201 which is mounted in a transmitting channel switch unit (TSW) 20. One of the data branches is transferred to a transmitting unit 21, and the other is applied to a switch circuit (SW) 202, but prevented from passing therethrough.

In the main channel transmitting unit 21, the bipolar data is first transformed into unipolar data, and a carrier wave is then modulated by the thus transformed unipolar data. A local oscillator for producing the carrier wave is not shown in the figure. Next, the modulated carrier wave is converted upward in frequency and energized to have enough transmission power to radiate from the transmitter to the receiver via a transmission line which includes a repeater or repeaters, more specifically, via a receiving and retransmitting unit or units 22 contained in each repeater.

The data from the last repeater is received by a receiving unit 23 located in the receiver, wherein the unipolar data is provided to a synchronous switch circuit (SSW) 24. The synchronous switch circuit (SSW) 24 transforms unipolar data to bipolar data and outputs the bipolar data to a switch circuit 25. The switch circuit 25 supplies the bipolar data to a receiving terminal station 29 to reproduce the original data. Incidentally, the synchronous switch circuit (SSW) 24 is usually fabricated using a semiconductor integrated circuit (IC) which is able to achieve high speed synchronous switching from the main channel data to the protection channel data. A switch circuit (RSW) 25 is located after the switch circuit (SSW) 24 to back-up the latter switch circuit 24.

In the normal state of the main channel system, it is theoretically not necessary to activate the protection channel system, but in practice, the protection channel system is activated so as to always supervise the condition of the protection channel system to maintain the normal state thereof. For this purpose, the protection channel system handles auxiliary data during activation of the main channel system. The auxiliary data is, for example, test data. The related test pulse is generated by a test pulse generator 30 and transmitted to a test pulse detector 33 located in the receiver, via the switch circuit 202, a protection channel transmitting unit 11, a receiving and retransmitting unit 12, a protection channel receiving unit 13 and the receiving channel switch circuit (RSW) 25. If the predetermined pattern of the test pulse is detected correctly by the detector 33, it is determined that the protection channel system is normal. In that case, the main channel can freely be switched to the protection channel when the transmission quality of the main channel data deteriorates.

(B) Case Where Fault Occurs at Repeater in Main Channel System

First, the original data is sent from the aforesaid data source in the transmitting terminal station 19 to the main channel transmitting unit 21, as shown by the first part of row (1) in FIG. 2A. The characters T1, T2, and so on, above row (1) denote a time scale, where $T1 < T2 < T3 < T4$, i.e., T1 occurs in time before T4. The data from the transmitting unit 21 is transmitted, as mentioned above, to the receiving terminal station 29, via the transmitting channel switch unit (TSW) 20, the main channel transmitting unit 21, the main channel receiving and retransmitting unit 22, the main channel receiving unit 23, the synchronous switch circuit (SSW) 24, and the receiving channel switch circuit (RSW) 25.

Suppose now that some fault occurs at the repeater, and accordingly a stoppage of data takes place in the main channel as shown in row (2) of FIG. 2B. The stoppage of data is detected after a time $t_1$ occurring from the stoppage of data, as shown in row (3) (FIG. 2C). The time $t_1$ is required by a data stoppage detector in order to detect the related data stoppage. This data stoppage detector (not shown) is usually mounted in the synchronous switch circuit (SSW) 24. The detection of data stoppage is reported by the data stoppage detector to a receiving control circuit 32, and the circuit 32 then transmits a command signal to a transmitting control circuit 31 via another transmission line 34, e.g., a downstream line instead of a upstream line through which the main channel data has been transmitted (refer to row (4)) (FIG. 2D). The symbol $t_2$ denotes the transmission time through the transmission line 34.

The transmitting control circuit 31 issues a switching signal to the switch circuit (SW) 202 in the transmitting channel switch unit (TSW) 20. When the switching signal is received, the switch circuit 202 changes its status from one state to the other state. Accordingly, the switch circuit 202 prevents the signal from the test pulse generator 30 from passing therethrough, while allowing the signal from the hybrid circuit (H) 201 to pass. Thus the transmitting channel switch unit (TSW) 20 provides data, instead of the test pulse, which is the same as the data which had been provided to the main channel up to that point in time and had been transferred to the protection channel transmitting unit 11, so that the data from the aforesaid data source is also transferred to the receiver via the protection channel. Under these conditions, the data is sent to both the main channel transmitting unit 21 and the protection channel transmitting unit 11. This is known as a parallel transmission. The symbol $t'_2$ (in row (6)) (FIG. 2F) denotes the time for downstream transmission of data through the transmission line (protection channel). The value of $t'_2$ is, of course, the same as that of the upstream transmission time $t_2$ (refer to row (4)) (FIG. 2D).

After a time $t_3$ (refer to row (7)) (FIG. 2G) occurring from the elapse of the time $t_2'$, the data starts being applied via the protection channel to the receiving synchronous switch circuit (SSW) 24. In this case, when the switch (SSW) 24 detects that the data, transmitted through the protection channel, has been received, the related detection signal from the switch (SSW) 24 is sent to the receiving control circuit 32 so that a switching signal (refer to row (7)) (FIG. 2G) from the control circuit 32 can be sent to the switch circuit (SSW) 24. This switching signal changes the status of the switch circuit (SSW) 24 so that it blocks the unipolar output signal from the main channel receiving unit 23, but allows the unipolar output signal from the protection channel receiving unit 13 to pass through the switch circuit (SSW) 24. Thereby, the inherent main channel data is transmitted from the transmitter to the receiving terminal station 29 via the protection channel system, i.e., the receiving unit 13, and also via the switch circuit (SSW) 24 and the switch circuit (RSW) 25. In this case, the aforesaid term $t_3$ represents the time required to confirm the detection of the received data through the protection channel and to switch the switch circuit (SSW) 24. It should be understood here that a response signal from the transmitter via the transmission line 34, and also a response signal from the switch circuit (SSW) 24, are omitted from FIGS. 2A through 2H for brevity.

In conclusion, an undesired interruption in data flow occurs during the time $t_4$ (refer to row (8) in FIG. 2H). That is, there is a partial data loss causing a data error. This is the problem occurring in the prior art data communication system. In this case, the interruption time $t_4$ is expressed as follows:

$$t_4 = t_1 + t_2 + t'_2 + t_3$$

Figure 3:
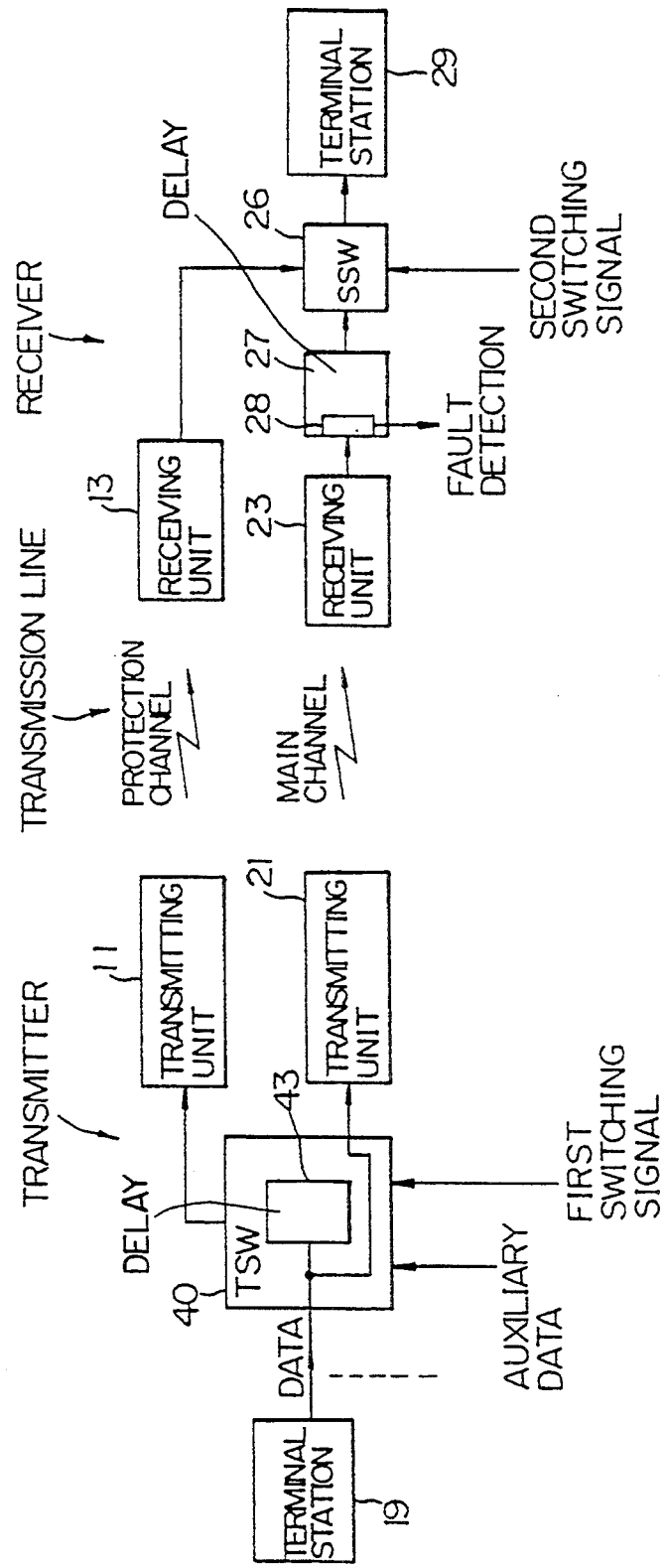
FIG. 3 is a principle block diagram of a data communication system according to the present invention.

FIG. 3 is a principle block diagram of a data communication system according to the present invention. Note that items identical to those explained before are represented by the same reference numerals or characters (this also applies to later figures). In this figure, a synchronous switch circuit (SSW) 26, a delay means ($\tau$) 27, a transmitting channel switch unit (TSW) 40 and another delay means ($\tau$) 43 are newly recited items. Among these, the SSW 26 and the TSW 40 are functionally similar to the aforesaid SSW 24 and TSW 20, respectively.

The delay means 27 delays the data in time by a period $\tau$. The delayed data is then received from the transmitter via the transmission line which usually includes a plurality of repeaters (not shown in FIG. 3 but indicated in FIG. 1 by reference numerals 12 and 22). The delay means 27 is located along a signal line through which the main channel is formed.

The transmitter contains therein another delay means ($\tau$) 43. The delay means 43 delays the data in time by a period $\tau$, the data being received from the aforesaid data source which is usually located in the transmitting terminal station 19. This data is to be transmitted to the receiver not by way of the main channel but by the protection channel.

The receiver contains therein a detection means 28 preferably in the delay means 27 as illustrated. The detection means 28 detects an occurrence of a transmission fault in the main channel. The detection means 28 is located in a preceding stage relative to the delay means 27, or in a front stage thereof.

The detection means 28 issues a fault detection signal if a related fault takes place. The fault detection signal induces two commands. The first command applies a first switching signal to the transmitting channel switch unit (TSW) 40 via the transmission line (shown as 34 in FIG. 1). The second command applies a second switching signal to the synchronous switch circuit (SSW) 26. The first switching signal activates the transmitter side (transmitting) channel switch unit 40 so as to transmit the original data from the aforesaid data source to the receiver by way of the transmitter side (transmitting) delay means 43 and through the protection channel. While, the second switching signal activates the receiver side (receiving) channel switching means, i.e., the synchronous switch circuit (SSW) 26, after a predetermined elapsed time from the detection of the transmission fault indicated by the fault detection signal. In this way the data received via the protection channel overlaps with the data delayed by the delay means ($\tau$) 27.

The delay times $\tau$ caused at both the delay means 43 and 27 are set to substantially the same time. Each delay time $\tau$ is defined as the aforesaid stoppage time (refer to "$t_4$" in row (8) of FIG. 2) plus a predetermined time margin.

General operation is as follows. When the original data is to be switched to the protection channel, e.g., transmitting unit 11, by means of the switch unit (TSW) 40, this data is delayed in time by the delay time $\tau$. The time $\tau$ is expressed as follows.

$$\tau = t_1 + t_2 + t'_2 + t_3 + t_\alpha$$

The meanings of each of the symbols $t_1, t_2 \ldots$, except for $t_\alpha$, have already been explained. The symbol $t_\alpha$ denotes a predetermined time margin. The remaining terms denote, as mentioned previously, that $t_1$ is a fault detection time, $t_2$ is a downstream transmission time $t'_2$ ($=t_2$) is an upstream transmission time, and $t_3$ is a switching time, and the symbol $t_4$ ($=t_1+t_2+t'_2+t_3$) represents a stoppage time of data flow which would inevitably occur in usual channel switching.

The delay time $\tau$ is created in the transmitter by the delay means 43 which is mounted in the transmitting channel switch unit (TSW) 40. To cope with this, the aforesaid delay means 27 is introduced between the main channel receiving unit 23 and the synchronous switching circuit 26. When a transmission fault is detected by the detection means 27, data is applied to both the main channel side input and the protection channel side input of the switch circuit 26, both blocks of data being the same as the data which had already been delayed by the time ($\tau$) before the occurrence of the related transmission fault. The aforesaid second switching signal is then supplied to the switch circuit (SSW) 26 by the end of the time $t_4$ (refer to row (8) of FIG. 2). During the time $t_4$ the delayed data, i.e., previous data, in the delay means 27 is maintained so that channel switching by the switch circuit (SSW) 26 can be achieved without stopping the data flow. It is important to understand that this channel switching can be achieved with no loss of data due to deterioration of the transmission quality caused by sudden fading or even a sudden problem with the electronic communication apparatus.

Figure 4:
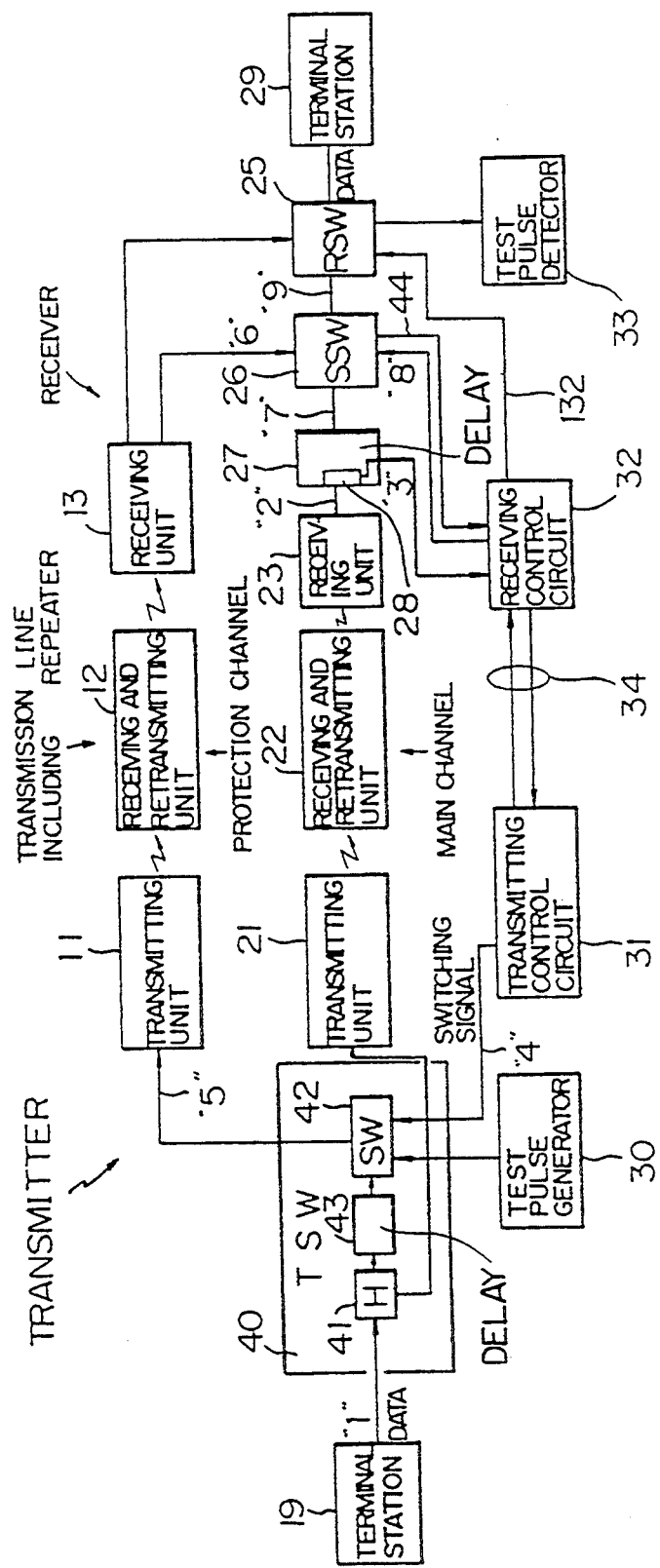
FIG. 4 is a more detailed block diagram of the data communication system shown in FIG. 3.
Figure 5:
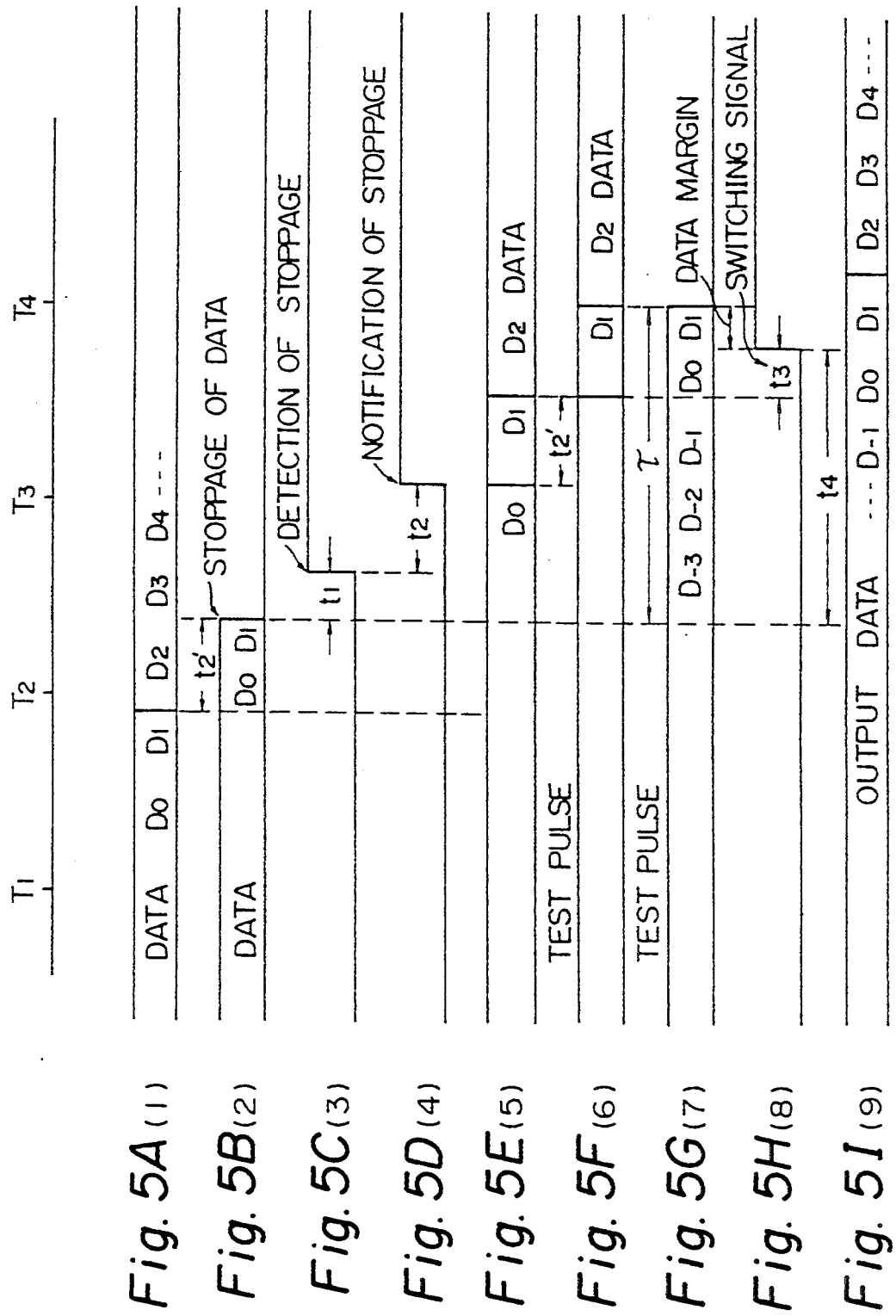
FIGS. 5A through 5I show timing charts illustrating one example of a channel switching procedure when a fault occurs in the system of FIG. 3.

FIG. 4 is a more detailed block diagram of a data communication system shown in FIG. 3, and FIG. 5 depicts a timing chart illustrating one example of a channel switching procedure when a fault occurs in the system of FIG. 3. The procedure shown FIG. 5 assumes a case where a transmission fault has occurred due to some trouble in the main channel receiving and retransmitting unit 22 in the system of FIG. 4. Like the previous FIGS. 1 and 2A through 2H, the numerals in parentheses in the leftmost column in FIGS. 5A through 5I indicate that the respective timing corresponds to numerals given in quotation marks "" in FIG. 4. Therefore, FIGS. 4 and 5A through 5I are read in the same manner as the previous FIGS. 1 and 2A through 2H. In FIG. 4, the transmitting channel switch unit (TSW) 40 is comprised of the delay means 43, a hybrid circuit (H) 41 (similar to the corresponding circuit 201 in FIG. 1) and a switch circuit (SW) 42 (similar to the corresponding circuit 202 in FIG. 1).

It should be recognized that the operation during the normal state of the main channel system, is identical to the operation which has been explained with respect to the prior art by referring to FIGS. 1 and 2A through 2H, except that the received data in the receiver (FIG. 4) according to the present invention, is always delayed by the delay time $\tau$ relative to that in the prior art receiver shown in FIG. 1. Accordingly, the following explanation will use as an example a case where a transmission fault has actually taken place.

Before the occurrence of a transmission fault, the original data is sent from the aforesaid data source in the transmitting terminal station 19, as shown in row (1) of FIG. 5A, the structure of this data being schematically illustrated, e.g., as shown by ... $D_{-1}, D_0, D_1, D_2$ ... The original data is transferred to the receiving terminal station 29 by way of the transmitting channel switch unit (TSW) 40, the main channel transmitting unit 21, the receiving and retransmitting unit 22, the receiving unit 23, the receiver side delay means 27, the synchronous switch circuit (SSW) 26, and the receiving channel switch circuit 25.

Here, assuming that a stoppage of data occurs due to the aforesaid transmission fault, e.g., a problem in the receiving and retransmitting unit 22. The stoppage of data is schematically shown in row (2) of FIG. 5B, where $t_2'$ denotes the transmission time of the data from the transmitter to the portion "2" in the receiver. The transmission fault, i.e., the stoppage of data, is detected by the fault detection means 28 within the fault detection time $t_1$ which is shown in row (3) of FIG. 5C. The related fault detection signal is sent to the receiving control circuit 32, and the receiving control circuit 32 issues a command to the transmitting control circuit 31 in the transmitter via the upstream channel of the transmission line 34. The control circuit 31 in the transmitter then provides the switching signal ("FIRST SWITCHING SIGNAL") in FIG. 3 as shown in row (4) of FIG. 5D. In row (4), the symbol $t'_2'$ denotes the transmission time for the command to be sent via the aforesaid upstream channel of the transmission line 34.

The transmitting control circuit 31 applies the first switching signal to the switch circuit (SW) 42 at a time $t_2$ after the end of the time $t_1$, in row (3) of FIG. 5C, in response to the notification of the stoppage of data flow. With the change of the switch circuit (SW) 42, the transmitting unit 11 switches the reception of the input signal. That is, the transmitting unit 11 stops transmitting the output from the test pulse generator 30 and starts transmitting the output from the delay means ($\tau$) 43, since in this situation the transmitting channel switch unit (TSW) 40 outputs the data, instead of the test pulse, as shown in row (5) of FIG. 5E. In this case, the output data is delayed by a time $\tau$ through the delay means 43 relative to the data which has been applied to the main channel transmitting unit 21, and the output data is then transmitted to the receiver via the protection channel, as shown in row (6) of FIG. 5F. In row (6), the symbol $t'_2'$ denotes the downstream transmission line forming the protection channel.

The data at the portion "6" received via the protection channel has passed through the transmitter side delay means ($\tau$) 43, and therefore is delayed by a time $\tau$, as shown between rows (6) and (7) of FIG. 5F and 5G. Thus, the receiver starts receiving the data via the protection channel after a time $t'_2'$ from the end of $t_2$ shown in row (4). The reception of data is detected in the synchronous switch circuit (SSW) 26 and the SSW 26 applies a signal reception detecting signal to the receiving control circuit 32 via a line 44. Responding to the detection signal, the circuit 32 returns a second switching signal to the switch circuit (SSW) 26, as shown in row (8) of FIG. 5H, after the switching time $t_3$.

The data which is received at the main channel receiving unit 23 is delayed through the receiver side delay means 27 by the delay time $\tau$ as shown in row (7) of FIG. 5G. This means that the preceding data is still maintained in the delay means 27 at the time when the status of the switch circuit (SSW) 26 is to be changed from the main channel path to the protection channel path. The thus maintained data prevents the data flow from being interrupted, and thus no stoppage of data flow occurs even when channel switching is triggered by a sudden occurrence of a transmission fault. In the above row (7), the data area indicated as "DATA MARGIN" corresponds to the previously mentioned time $t_\alpha$, i.e., a predetermined time margin. This time margin is necessary to establish synchronization, performed in the synchronous switch circuit (SSW) 26, between the main channel data sent from the delay means 27 and the same data sent via the protection channel.

Figure 6:
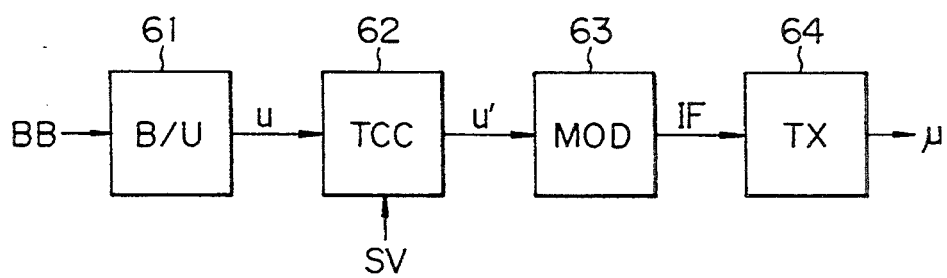
FIG. 6 illustrates a detailed example of a transmitting unit.

FIG. 6 illustrates a detailed example of a transmitting unit. Both the main channel transmitting unit 21 and the protection channel transmitting unit 11 (both shown in FIG. 4) can be commonly realized by the construction shown in FIG. 6. Bipolar base band data BB, sent from the hybrid circuit (H) 41 or the switch circuit (SW) 42 is transformed into unipolar data u by means of a bipolar to unipolar convertor (B/U) 61. The data u is further provided with supervisory information SV including, for example frame synchronization information, to form data u', by means of a transmit code convertor (TCC) 62. The data u' modulates a carrier wave provided from a local oscillator contained in a modulator (MOD) 63 using a standard modulation method, e.g., a 16 QAM method, to obtain an IF modulation signal ("IF"). The IF modulation signal is then converted up in frequency by a radio transmitter (TX) 64 to produce a microwave transmission signal $\mu$ to be radiated to the receiver. The TCC 62 further achieves speed conversion of the unipolar data by, e.g., a stuffing operation, and also adds a frame synchronization pulse and a parity bit, and scrambles the data.

Figure 7:
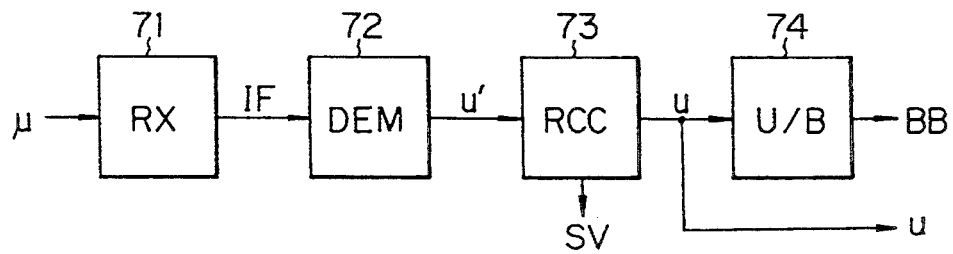
FIG. 7 illustrates a detailed example of a receiving unit.

FIG. 7 illustrates a detailed example of a receiving unit. Both the main channel receiving unit 23 and the protection channel receiving unit 13 (both shown in FIG. 4) can be commonly realized by the construction shown in FIG. 7. The microwave transmission signal $\mu$ is received by a radio receiver (RX) 71 and transformed into an IF signal ("IF"). The IF signal is then applied to a demodulator (DEM) 72 to reproduce the unipolar data u'. The data u' is applied to a receive code converter (RCC) 73 to extract therefrom the supervisory information SV. The original unipolar data u output from the RCC 73 is applied to a unipolar to bipolar convertor (U/B) 74 to reproduce the original base band data BB. The RCC 73 further carries out a frame synchronizing operation, supervises the transmission quality by using a parity check, and descrambles and de-stuffs the data.

Figure 8:
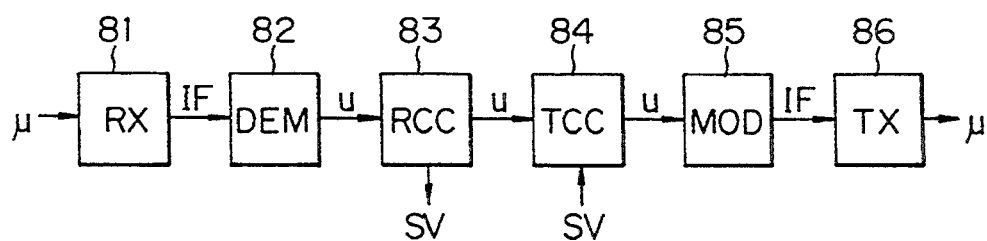
FIG. 8 illustrates a detailed example of a receiving and retransmitting unit.

FIG. 8 illustrates a detailed example of a receiving and retransmitting unit. Both the main channel receiving and retransmitting unit 22 and the protection channel receiving and retransmitting unit 12 (both shown in FIG. 4) can be commonly realized by the construction shown in FIG. 8. The microwave transmission signal $\mu$ from the transmitting unit (FIG. 6) is received at a radio receiver (RX) 81 and transformed into an IF signal ("IF"). The IF signal is demodulated at a demodulator (DEM) 82 to obtain a reproduced unipolar data u'. The unipolar data u' is applied to a receive code convertor (RCC) 83 from which the aforesaid supervisory information SV is extracted. The data u output from the RCC 83 is then applied to a transmit code convertor (TCC) in which other supervisory information SV is inserted into the received unipolar data. The data u' containing the information SV is modulated by a modulator (MOD) 85 using a standard method, e.g., a 16 QAM method, and an IF modulation signal ("IF") is obtained therefrom. The IF modulation signal is then converted up in frequency by a radio transmitter (TX) 86 to produce a microwave transmission signal $\mu$ to be radiated to the receiving unit (FIG. 7).

Figure 9:
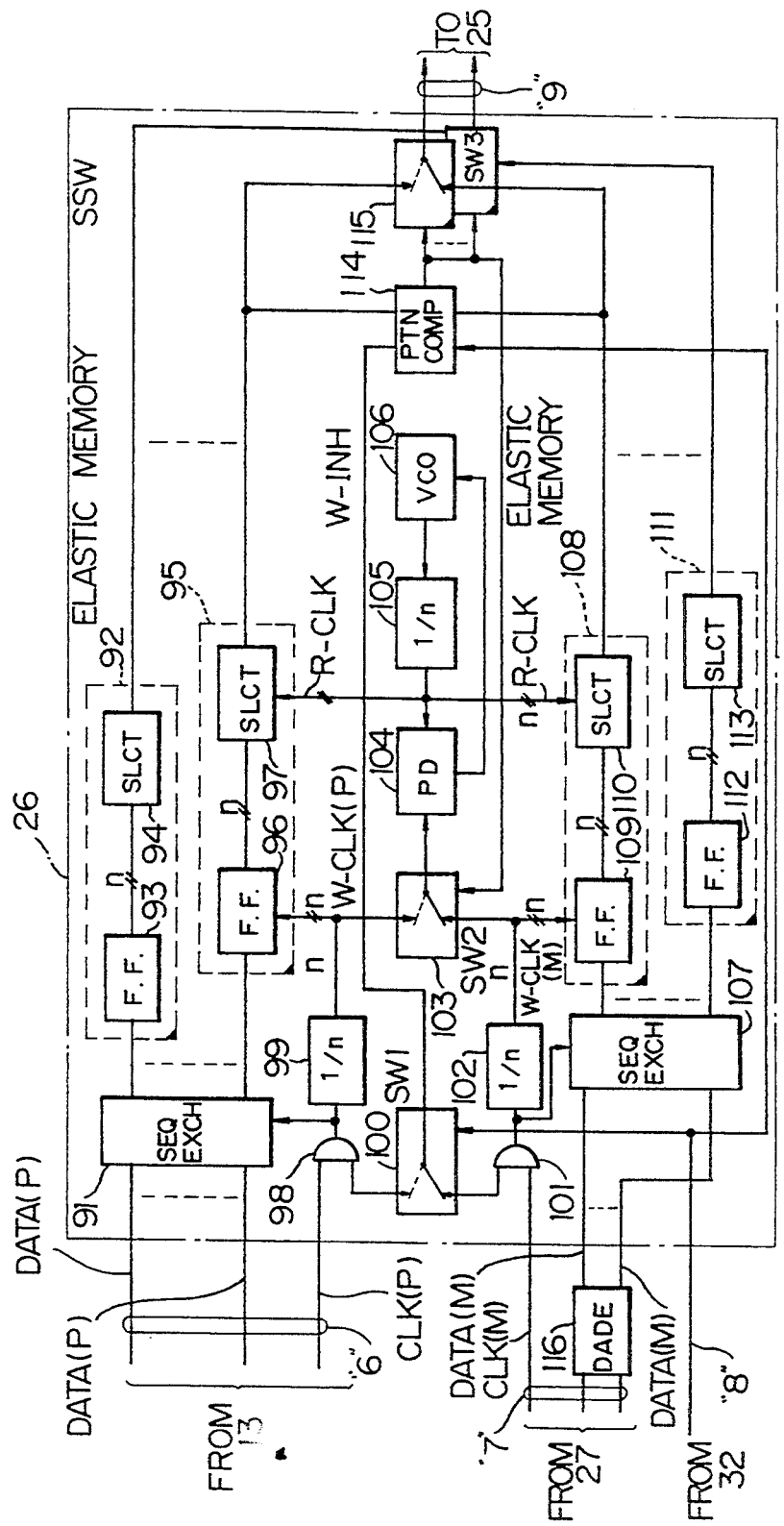
FIG. 9 illustrates a detailed example of a synchronous switch circuit.
Figure 10:
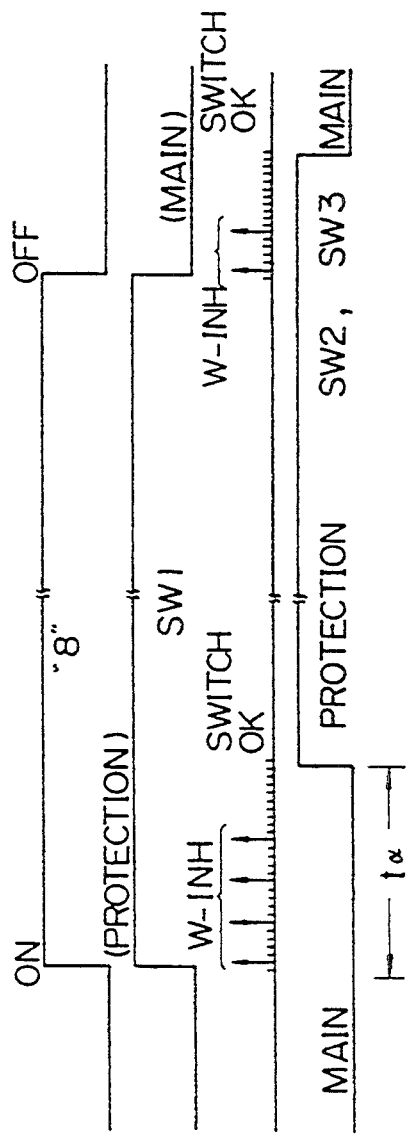
FIGS. 10A through 10D show timing charts illustrating the operation of the circuit in FIG. 9.

FIG. 9 illustrates a detailed example of a synchronous switch circuit. The synchronous switch circuit, which is shown as SSW 26 in FIG. 4, receives the unipolar outputs from the protection channel receiver 13, the delay means 27, and the receiving control circuit 32. In FIG. 9, reference numerals in quotation marks, i.e., "6", "7", "8", and "9", correspond to the same numerals used in FIG. 4. The synchronous switch circuit (SSW) 26 produces bipolar output data which is sent to the receiving channel switch circuit 25 shown in FIG. 4.

The synchronous switch circuit (SSW) 26 basically achieves a bit by bit phase synchronization between the main channel data ("DATA(M)") sent from the delay means 27 via "7", and the protection channel data ("DATA(P)") sent from the protection channel receiver 13 via "6". The characters CLK(M) and CLK(P) denote the clocks which define the timing of the data "DATA(M)" and "DATA(P)", respectively. The main channel data "DATA(M)" is processed by a differential absolute delay equalizer (DADE) 116 which compensates the absolute difference time between the protection channel and the main channel, before entering into the SSW 26. The data "DATA(P)" and "DATA(M)" are first applied to respective sequence exchangers (SEQ EXCH) 91 and 107. It should be understood here that the sequence exchangers are not essential in understanding the SSW 26 per se. That is, if the data transmission is subjected to the aforesaid 16 QAM, i.e., 16 Quadrature Amplitude Modulation, method, four data groups are handled. Each of the sequence exchangers functions to rearrange the order of these data groups to conform to a prescribed order. The outputs of the main channel and protection channel from these sequence exchangers 91 and 107 are applied to elastic memories 92, 95 (only two of four are illustrated for brevity) and elastic memories 108, 111 (only two of four are illustrated for brevity). The elastic memories contain therein respective flip flops (FF's) 93, 96 and 109, 112, and also contain therein respective selectors (SLCT's) 94, 97 and 110, 113. The flip flops (FF's) momentarily store the respective input data, i.e., "DATA(P)" and "DATA(M)". The store operations are achieved under control of write clocks, i.e., "W-CLK(P)" and "W-CLK(M)", sent from a phase-lock loop circuit via a switch (SW2) 103. It should be noted that switches (SW1) 100, (SW2) 103 and (SW3) 115 assume the switch connections indicated by solid lines in the figure in the normal state of the main channel system.

FIGS. 10A through 10D show timing charts illustrating the operation of the circuit in FIG. 9. The following explanation will refer to FIG. 9 and, if necessary, FIGS. 10A through 10D. The above-mentioned condition of the switch (SW1) 100 will be clarified by referring to row (2) of FIG. 10B.

If a transmission fault takes place, the aforesaid second switching signal is applied to the SSW26 via the line indicated by "8" in FIG. 9. The second switching signal changes, in this case, from "L" (low) to "H" (high) as shown in row (1) of FIG. 10A. Responding to the change, the switch (SW1) changes its switch connection to the other side, indicated by a broken line in FIG. 9. In this state, the clock "CLK(P)" is controlled by means of an AND gate 98 which receives at one input, a write inhibit signal "W-INH" which is issued from a pattern comparator (PTN COMP) 114. The output from the comparator 114 is depicted in row (3) of FIG. 10C. In row (3), the write inhibit signal "W-INH" is generated every time it is detected that the phase of the protection channel data "DATA(P)" does not coincide with that of the main channel data (M)", this comparison being effected on a bit pattern by bit pattern basis in the pattern comparator 114, until the phases of both the protection and main channel data coincide with each other. If the phases do not match each other, the signal "W-INH", which is actually a pulse of "L" level, is produced. Therefore, when there is a phase mismatch, the "L" pulse is applied to the input of the AND gate 98 to remove one clock pulse from the pulse train of the clock "CLK(P)". The thus adjusted clock "CLK(P)" is divided in frequency by a frequency divider (1/n) 99 to obtain the adjusted write clock "W-CLK(P)" which controls the store operation of the flip flops 93, 96. On the other hand, the write clock "W-CLK(M)" is not subjected to the write inhibit signal, and therefore continues the write operation uninterrupted.

The read operations of the protection and main channel data are achieved under control of a read clock, i.e., "R-CLK", which is common to both channels and comes from the aforesaid phase-lock loop (PLL) circuit comprised of a phase detector (PD) 104, a frequency divider (1/n) 105, and a voltage controlled oscillator (VCO) 106. The aforesaid PLL circuit is useful, due to a so-called fly wheel effect, for achieving fine phase adjustment between the protection channel data and the main channel data on a bit by bit basis. The switch (SW2) 103 changes its switch connection when the above mentioned pattern matching is attained by the comparator 114, as shown in row (4) of FIG. 10D. At the same time, the switch (SW3) 115 also changes its switch connection.

An operation identical to the one mentioned above occurs when the data channel returns from the protection side to the main side (refer to the change from (PROTECTION) to (MAIN) in row (2), by the use of the AND gate 101, a frequency divider (1/n) 102, and so on.

It should be noted that, in FIGS. 10A through 10D, the symbol $t_\alpha$ represents the aforesaid time margin. That is, during the time $t_\alpha$, the protection channel system is readied for the switch from the main channel system.

Figure 11:
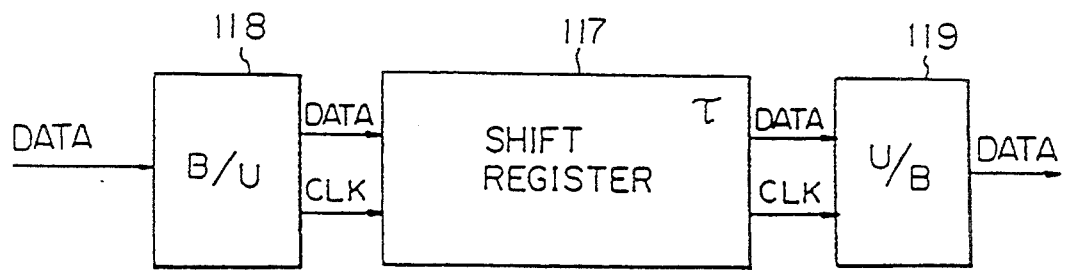
FIG. 11 illustrates a detailed example of a transmitter side delay means.

FIG. 11 illustrates a detailed example of a transmitter side delay means. The delay means 43 can be simply realized by a bipolar to unipolar convertor 118, a unipolar to bipolar convertor 119, and a shift register 117 which sequentially stores the data received from the aforesaid data source via the hybrid circuit (H) 41 (FIG. 4). The register 117 is supplied with a clock signal "CLK" used to shift the stored data given from B/U convertor 118. Finally, the shifted data is transformed from unipolar to bipolar signal by the U/B convertor 119.

Figure 12:
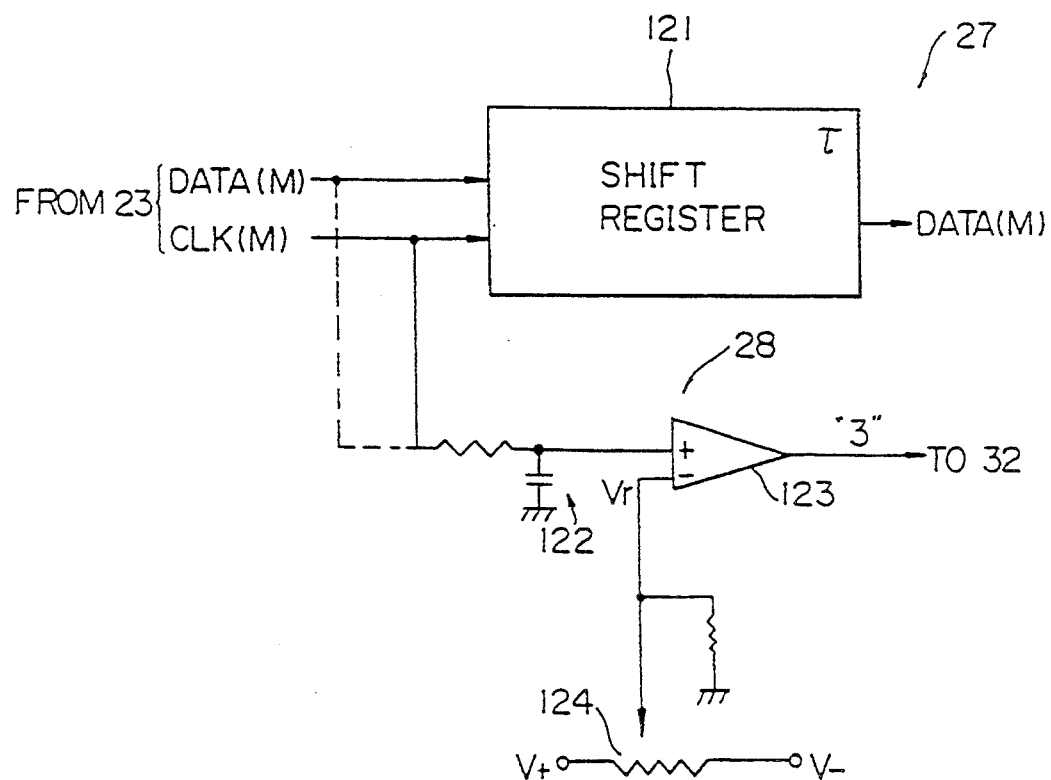
FIG. 12 illustrates a detailed example of a receiver side delay means which is provided with a detection means.

FIG. 12 illustrates a detailed example of a receiver side delay means provided with a detection means. The receiver side delay means 27 in FIG. 4 can also be simply realized by a shift register 121. The shift register 121 is provided with an input from the detection means 28 shown in FIG. 4. The detection means 28 can be realized by a detection circuit, as illustrated, which is comprised of an integrating circuit 122, e.g., a CR integrating circuit, and a comparator 123. The detection circuit (28) is supplied with a clock "CLK(M)" and data "DATA(M)" transferred from the main channel receiving unit 23. The clock is usually generated with a mark ratio of 50%. The output of the integrating circuit 122 maintains a minimum voltage level as long as the clock exists. If a transmission fault occurs, the clock is not supplied to the integrating circuit 122, so that the output voltage level decreases. When the thus decreased voltage level becomes lower than a predetermined reference voltage level $V_r$, the comparator 123 detects the transmission fault and outputs a fault detection signal which is then sent to the receiving control circuit 32 via the line marked "3" in FIG. 4. The reference voltage $V_r$ is adjustable by means of a variable resistor 124.

It should be understood that the integrating circuit 122 can be supplied with the data "DATA(M)", instead of the clock "CLK(M)".

The data (M) is sent to the shift register 121 to obtain the delayed data "DATA(M)" which is then transferred to the synchronous switch circuit (SSW) 26 of FIG. 4.

Figure 13:
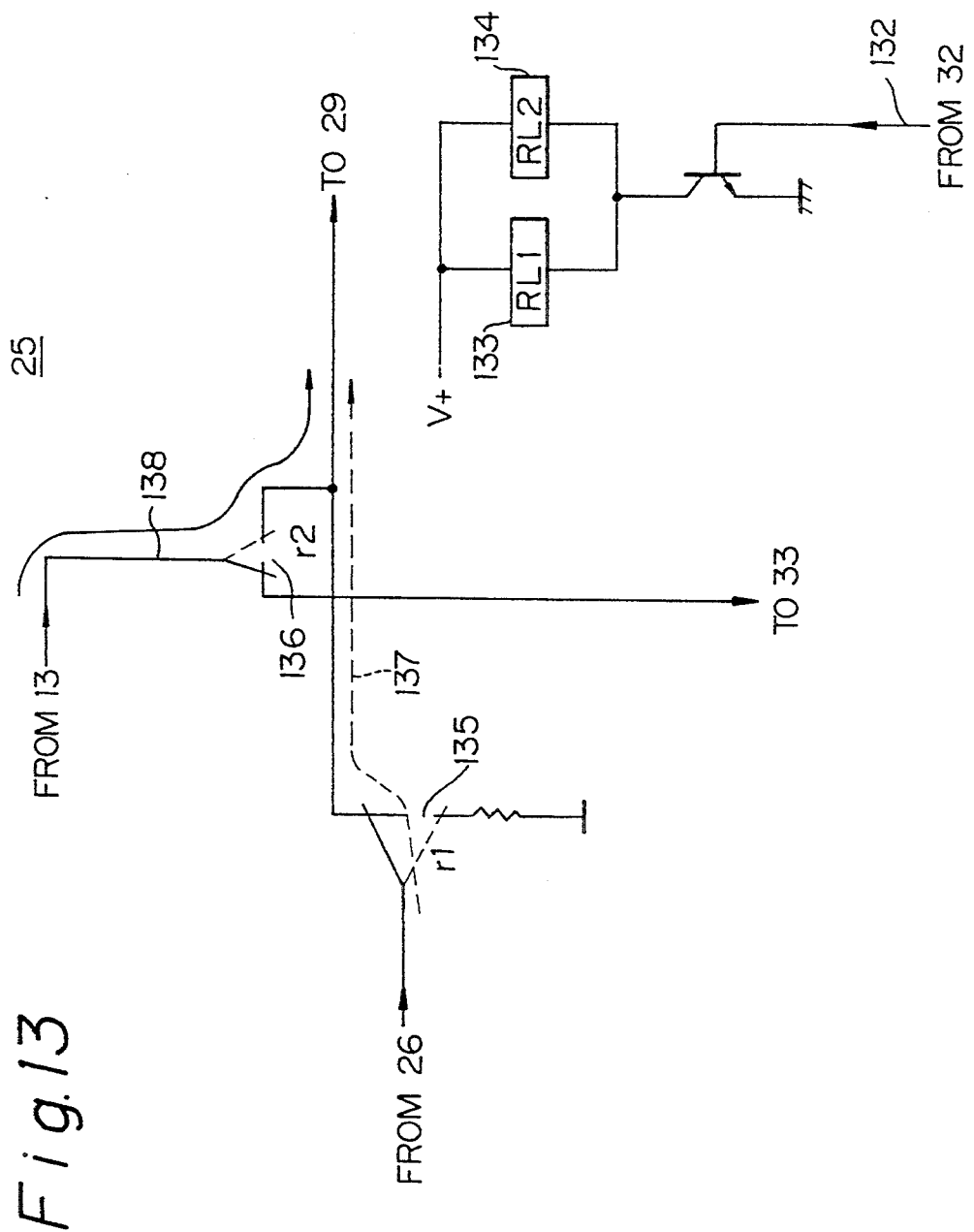
FIG. 13 illustrates a detailed example of a receiving channel switch circuit.

FIG. 13 illustrates a detailed example of a receiving channel switch circuit. The receiving channel switch circuit (RSW) 25 in FIG. 4 can be realized by relay coils (RL1) 133 and (RL2) 134. The relay coils 133 and 134 operate their respective relay contacts (r1) 135 and (r2) 136. The broken line 137 indicates the flow of the main channel data in a normal state of the main channel system. The solid line 138 indicates the flow of the protection channel data when a fault condition exists in the main channel system. The switching signal sent via a line 132 (refer also to FIG. 4) drives a transistor and energizes or de-energizes the relay coils 133 and 134. The remaining items, for example, items 13, 26, 29, 32, and 33 are identical to those items having the same numerals shown in FIG. 4.

Figure 14:
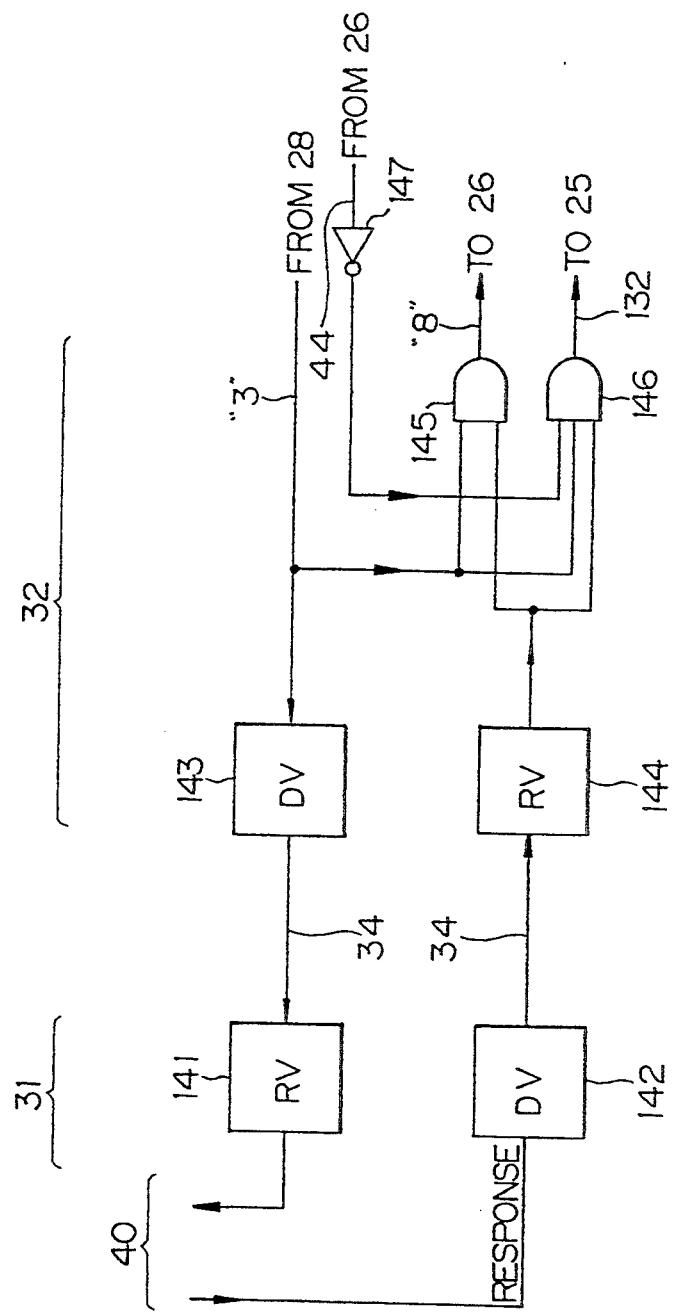
FIG. 14 illustrates a detailed example of receiving and transmitting control circuits.

FIG. 14 illustrates a detailed example of receiving and transmitting control circuits. The fault detection signal is applied, via the line "3" (refer to FIG. 4), from the detection means 28 and then transmitted to a radio receiver (RV) 141 in the transmitter side control circuit 31 by way of a radio driver (DV) 143 and the transmission line (upstream channel) 34. The thus transmitted fault detection signal is received by the transmitting channel switch unit (TSW) 40. In responding to the same, the TSW 40 returns a response signal to the receiving control circuit 32 by way of a radio driver (DV) 142, the transmission line (downstream channel) 34, and a radio receiver (RV) 144. The thus transmitted response signal is applied to two AND gates 145 and 146. The AND gate 145 also receives the fault detection signal from the detection means 28 and a signal reception detecting signal from the SSW 26 via the line 44 (FIG. 4). Then the AND gate 145 produces an output as a switching signal, to be sent to the synchronous switch circuit (SSW) 26 via the line "8" (refer to FIG. 4). The inverter gate 147 receives a signal reception detecting signal given from the SSW 26 via the line 44 (FIG. 4) and outputs reversed signal to AND gate 146. The AND gate 146 receives, other than said response signal, the fault detection signal sent via the line "3" and a signal reverced reception detecting signal given from the gate 147, to produce an output, as a switching signal, to be sent to the receiving channel switch circuit (RSW) 25 via the line 132 (refer to 132 in FIG. 4). The above-mentioned signal reception detecting signal on the line 44 can be obtained, for example, as shown in FIG. 9, from the flip flops (FF) 93 and 96.

Figure 15:
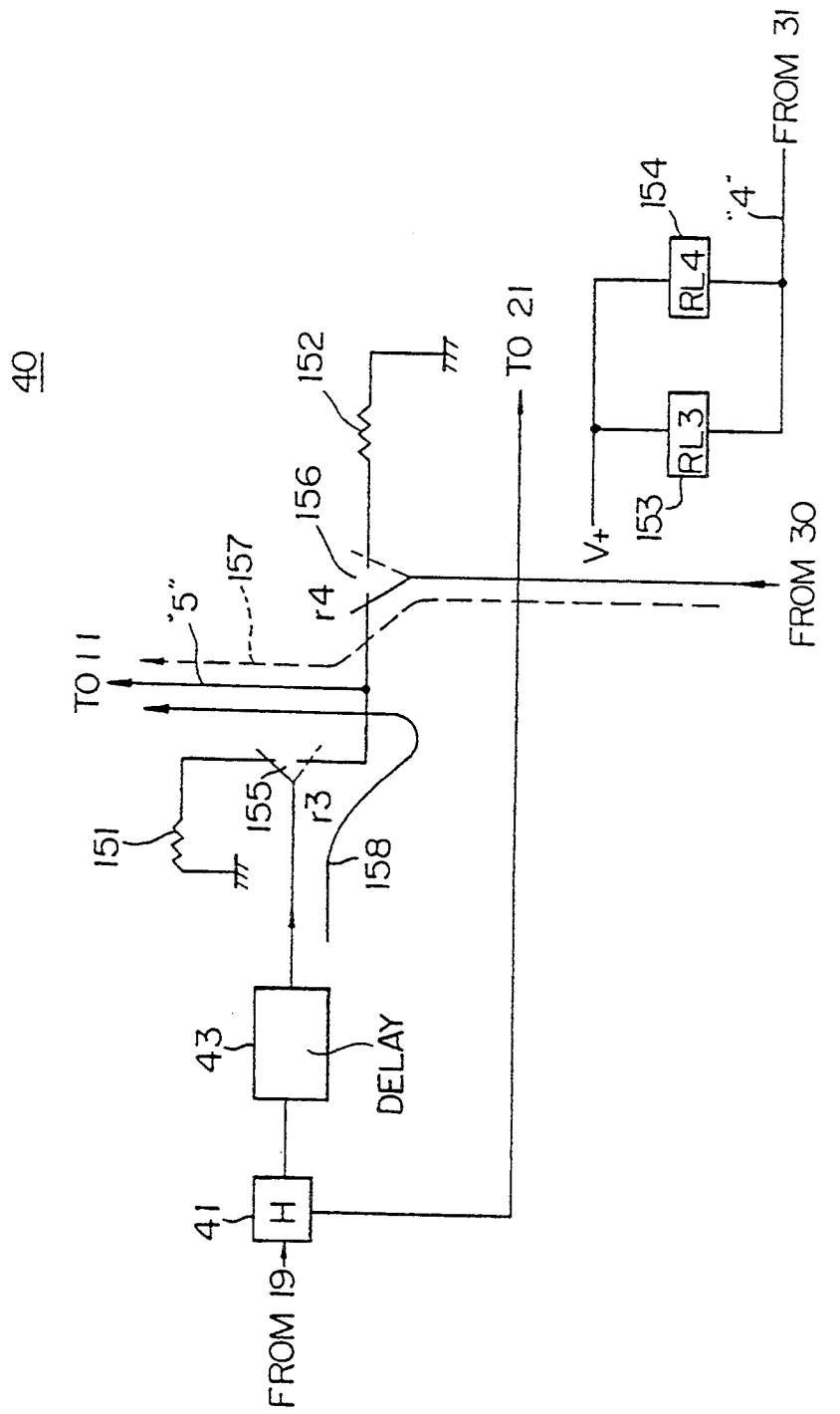
FIG. 15 illustrates a detailed example of a transmitting channel switch unit.

FIG. 15 illustrates a detailed example of a transmitting channel switch unit. The transmitting channel switch unit (TSW) 40 in FIG. 4 can be realized by relay coils (RL3) 153 and (RL4) 154. The relay coils 153 and 154 operate their respective relay contacts (r3) 155 and (r4) 156. The broken line 157 indicates the flow of the auxiliary data, e.g., the test pulse from the test pulse generator 30 in a normal state of the main channel system. The solid line 158 indicates the flow of the protection channel data supplied from the data source in the transmitting terminal station 19. When a fault condition exists in the main channel system. The first switching signal sent from the transmitting control circuit 31 via the line "4" (refer to FIG. 4) energizes the relay coils 153 and 154.

Reference numerals 151 and 152 represent terminating resistors, the remaining items, such as 41 and 43, are identical to those shown in FIG. 15.

Figure 16:
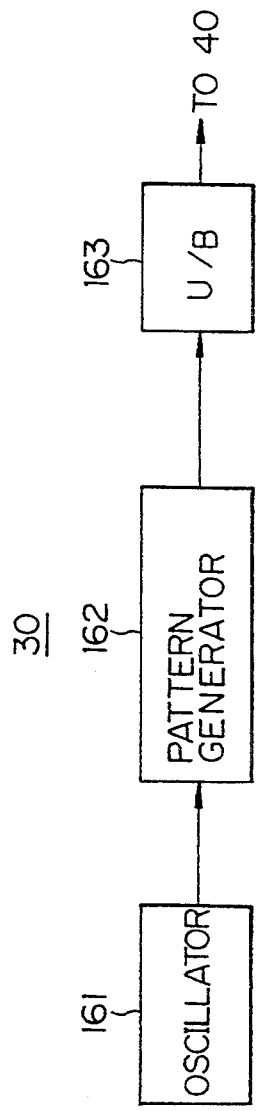
FIG. 16 is a specific block diagram of a test pulse generator.

FIG. 16 illustrates a specific block diagram of a test pulse generator. The test pulse generator 30 shown in FIG. 4 is comprised of a clock oscillator 161, a pattern generator 162, and a unipolar to bipolar convertor (U/B) 163. The output of the generator 30 is sent to the transmitting channel switch unit (TSW) 40 of FIG. 4. The oscillator 161 produces a clock having a frequency the same as that of the data supplied from the data source. The pattern generator 162 produces a pulse having a predetermined pulse pattern which is suitable as a supervisory test pattern.

Figure 17:
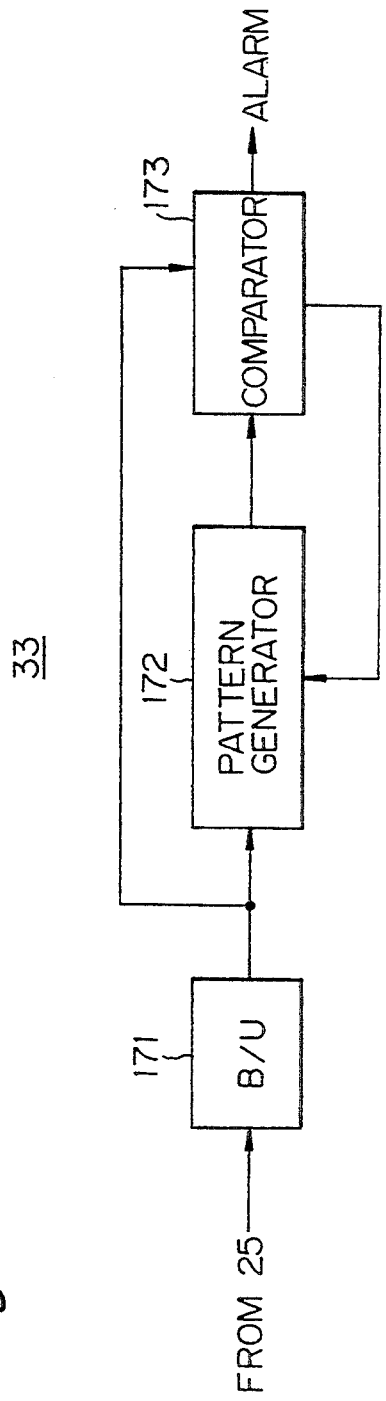
FIG. 17 is a specific block diagram of a test pulse detector.

FIG. 17 illustrates a specific block diagram of a test pulse detector. The test pulse detector 33 shown in FIG. 4 is comprised of a bipolar to unipolar convertor (B/U) 171, a pattern generator 172, and a comparator 173. The test pulse is received from the receiving channel switch circuit (RSW) 25 and converted into a unipolar test pulse which is applied to the comparator 173 at its first input. The second input thereof is supplied with the output from the pattern generator 172. The comparator 173 compares its two input signals and produces a mismatch signal as long as the two input signals do not coincide with each other. The pattern generator 172 changes the phase of its output bit by bit every time the mismatch signal is applied thereto. During the sweep of the phase change, the two above-mentioned input signals will coincide with each other. If such coincidence cannot be detected even after a predetermined time, an alarm signal will be produced to alert an operator to repair the related fault which has occurred in the protection channel system.

As explained above in detail, the data communication system according to the present invention contains therein a channel switching means which can switch a main channel to a protection channel, if a transmission fault takes place in the main channel system, with no data loss during the switch. That is, an instantaneous stoppage of data flow is prevented. This ability is remarkable when the transmission fault takes place quickly, due to, for example, sudden fading, sudden trouble in the electronic communication apparatus, and the like.

I claim:

1. A data communication system for sending data over a main channel and a protection channel, said system comprising:
   transmitter means for providing said data to the main channel, for delaying said data to produce first delayed data and for providing said first delayed data to the protection channel, said transmitter means including:
   channel switching means for selectively providing said first delayed data to the protection channel when receiving a command signal that indicates a transmission fault on the main channel;
   receiver means for receiving said data from the main channel and said first delayed data from the protection channel, said receiver means including:
   delay means for delaying said data received from said transmitter means via the main channel to produce second delayed data, and
   detection means for detecting the transmission fault and, in response, providing the command signal; and
   wherein a first delay time of said first delayed data is substantially the same as a second delay time of said second delayed data, each of said first and second delay times comprising a data-stoppage time between occurrence of the transmission fault and the detection of the transmission fault, a first propagation delay time indicative of a length of time the command signal propagates from said detection means to said channel switching means, a second propagation delay time indicative of a length of time said first delayed data propagates through the protection channel to said receiver means, and a period of time required to confirm receipt by said receiver means of said first delayed data and to switch an output of said data communication system from said second delayed data to said first delayed data.

2. A data communication system as set forth in claim 1, wherein said detection means includes:
   means for providing a command signal to said channel switching means so as to cause said first delayed data to be provided to the protection channel.

3. A data communication system as set forth in claim 2, further comprising:
   additional channel switching means for receiving said second delayed data from the main channel and said first delayed data from the protection channel and for providing said first delayed data from the protection channel in response to an additional command signal; and
   wherein said detection means further includes:
   means for providing the additional command signal to activate said additional channel switching means a predetermined elapsed time after detecting the transmission fault so that said first delayed data received via the protection channel overlaps with said second delayed data delayed by said delay means during switching by said additional channel switching means.

4. A data communication system as set forth in claim 3, wherein said transmitter means comprises additional delay means to produce said first delayed data, and said additional delay means and said delay means delay said first and second delayed data, respectively by substantially the same amount of delay time.

5. A data communication system as set forth in claim 4, wherein the delay time includes a data flow stoppage time and a predetermined time margin.

6. A data communication system as set forth in claim 5, wherein said additional channel switching means includes:
   synchronous switch circuit means for selectively providing one of said second delayed data from the main channel and said first delayed data from the protection channel in accordance with a switch signal having a status, and wherein,
   said delay means is operatively connected between the main channel and said synchronous switch circuit means.

7. A data communication system as set forth in claim 6, wherein the predetermined time margin includes a time required to achieve a phase synchronization in said synchronous switch circuit means between said second delayed data from the main channel received via said delay means and said first delayed data received from the protection channel.

8. A data communication system as set forth in claim 1, wherein said delay means comprises a shift register.

9. A data communication system as set forth in claim 4, wherein said additional delay means comprises a shift register.

10. A data communication system as set forth in claim 3, wherein said detection means comprises:
    a circuit operatively connected to provide one of the main channel data and a main channel clock signal as an output; and
    comparator means for comparing the output from said circuit and a predetermined reference voltage and, in response, providing a signal to said means for providing the additional command signal.

11. A data communication system as set forth in claim 6, wherein said synchronous switch circuit means comprises:
    protection channel elastic memory means for storing said first delayed data from the protection channel;
    main channel elastic memory means for storing said second delayed data from the main channel;
    protection channel clock means for providing a first clock signal to said protection channel elastic memory means;
    main channel clock means for providing a second clock signal to said main channel elastic memory means;
    pattern comparator means for comparing respective phases of the stored data in said protection and main channel elastic memory means, and for inhibiting one of said first clock signal and said second clock signal if the phases of the thus compared data do not match, so as to cause the phases of the compared data to coincide with each other; and
    means for changing the status of said switch signal.

12. A data communication system according to claim 1, wherein said data communication system further comprises:
    test pulse generator means for generating test pulses;
    wherein said channel switching means comprises means for providing the test pulses to the protection channel when the command signal does not indicate a transmission fault on the main channel; and
    wherein said transmitter means comprises means for providing the test pulses from said test pulse generator to the protection channel and providing the first delayed data to the protection channel, in response to said channel switching means.

13. A data communication system as claimed in claim 1, wherein each of said first and second delay times further comprises a predetermined time margin to establish synchronization between said first and second delayed data.

14. A data communication system for sending data over a main channel and a protection channel from a transmitter to a receiver, the transmitter comprising:
first transmission means for providing the data to the main channel;
second transmission means for delaying the data to produce first delayed data and for providing the first delayed data to the protection channel, said second transmission means including:
channel switching means for selectively providing the first delayed data to the protection channel when receiving a command signal that indicates a transmission fault on the main channel;
the receiver comprising:
first receiver means for receiving the data from the main channel;
delay means for delaying the data received by said first receiver means to produce second delayed data;
second receiver means for receiving the first delayed data from the protection channel; and
detection means for detecting a transmission fault based on the data from the main channel and providing the command signal; and
wherein a first delay time of said first delayed data is substantially the same as a second delay time of said second delayed data, each of said first and second delay times comprising a data-stoppage time between occurrence of the transmission fault and the detection of the transmission fault, a first propagation delay time indicative of a length of time the command signal propagates from said detection means to said channel switching means, a second propagation delay time indicative of a length of time said second delayed data propagates through the protection channel to said second receiver means, and a period of time required to confirm receipt by said second receiver means of said first delayed data and to switch an output of said data communication system from said second delayed data to said first delayed data.

15. A data communication system according to claim 14, wherein said data communication system further comprises test pulse generator means for generating test pulses;
wherein said channel switching means comprises means for providing the test pulses to the protection channel when the command signal does not indicate a transmission fault on the main channel; and
wherein said second transmission means comprises means for providing the test pulses from said test pulse generator to the protection channel and providing the first delayed data to the protection channel, in response to said channel switching means.

16. A data communication system as claimed in claim 14, wherein each of said first and second delay times further comprises a predetermined time margin to establish synchronization between said first and second delayed data.

17. A data communication system for sending information data from an input terminal over a main channel and a protection channel to an output terminal, said system comprising:
transmitter means, receiving said information data from the input terminal, for providing said information data to the main channel regardless of whether a transmission fault exists on the main channel, for delaying said information data to produce first delayed data and for outputting said first delayed data, said transmitter means comprising:
first channel switching means for selectively enabling transmission of said first delayed data output from said transmitter means to the protection channel in response to a command signal indicative of a transmission fault on the main channel; and
receiver means for receiving said information data from the main channel, and for receiving said first delayed data when the fault exists on the main channel, said receiver means comprising:
detection means for determining whether the transmission fault exists on the main channel and, in response, providing the command signal,
delay means for delaying said information data transmitted over the main channel to produce second delayed data after the determination by said detection means, and
second channel switching means alternately enabling transmission of one of said first and second delayed data in dependence upon the determination of said detection means.

18. A data communication system for sending information data from an input terminal over a main channel and a protection channel to an output terminal, said system comprising:
transmitter means, receiving said information data from the input terminal, for providing said information data to the main channel, and selectively providing the same information data delayed a predetermined time period as first delayed data to the protection channel in response to a command signal indicative of a transmission fault on the main channel; and
receiver means for receiving said information data from the main channel, and for receiving said first delayed data when the fault exists on the main channel, said receiver means comprising:
detection means for determining whether the transmission fault exists on the main channel and, in response, providing the command signal,
delay means for delaying, after the determination by said detection means, said information data transmitted over the main channel to produce second delayed data, and
second channel switching means for alternately enabling transmission of one of said first and second delayed data to the output terminal in dependence upon the determination of said detection means.

* * * * *